United States Patent [19]

Davidge

[11] Patent Number: 5,313,316
[45] Date of Patent: May 17, 1994

[54] MIRROR AND CADDY FOR USE IN SHOWERS

[75] Inventor: Gregory M. Davidge, Maui, Hi.

[73] Assignee: Tortoise Prouducts, Inc., Kula, Hi.

[21] Appl. No.: 980,540

[22] Filed: Nov. 23, 1992

[51] Int. Cl.⁵ .......................... G02B 7/195; G02B 5/08
[52] U.S. Cl. .................................. 359/509; 359/845;
D6/525; D6/526; D6/527
[58] Field of Search ................ 359/509, 845; D6/525,
D6/526, 527, 542, 543

[56] References Cited

U.S. PATENT DOCUMENTS

| | | | |
|---|---|---|---|
| D. 309,225 | 7/1990 | Scarbro | D6/525 |
| 3,869,183 | 3/1975 | Frank, Jr. | D6/525 |
| 4,150,869 | 4/1979 | Hansen | D6/525 |
| 4,836,668 | 6/1989 | Christianson | 359/509 |

*Primary Examiner*—Scott J. Sugarman
*Attorney, Agent, or Firm*—Laff, Whitesel, Conte & Saret

[57] ABSTRACT

A mirror for use in a steamy environment such as a shower stall. The mirror has a recess for holding a cylindrical can of shaving cream while exposing half of the can for easy grasping. Either a magnet or straps may be used to hold the can in the recess. A water channel has a push button valve for controlling water flow. The stream of flowing water equalizes the temperature of the mirror with the surrounding environment. A fitting at the bottom of the mirror may be turned in order to direct a stream of water in any suitable direction to wash away shaving debris from a razor. The water supply for the mirror may be obtained from an existing shower head supply pipe and may be diverted exclusively to the mirror, so that when the mirror is in use, water flows only when requested by the user.

22 Claims, 2 Drawing Sheets

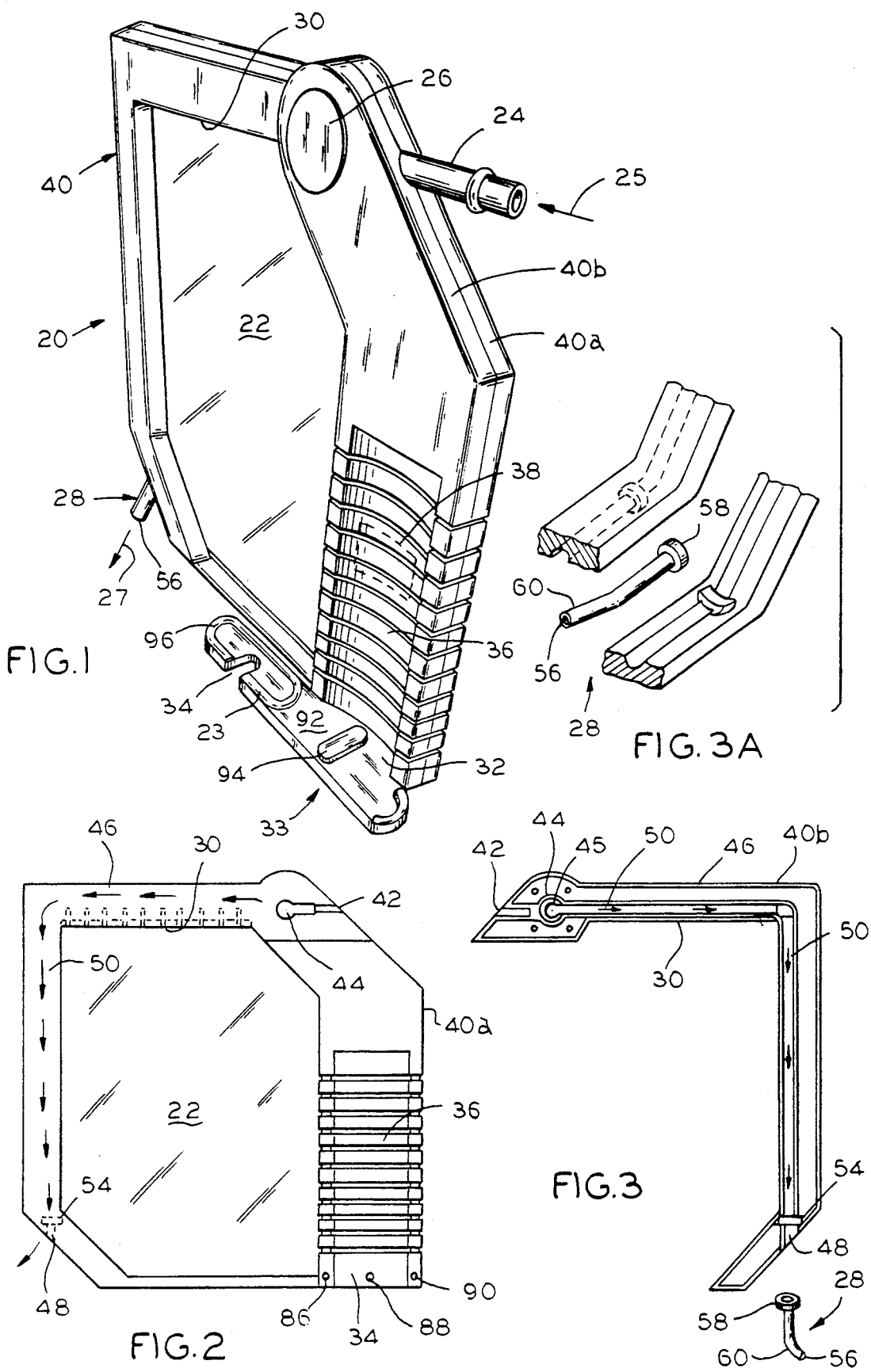

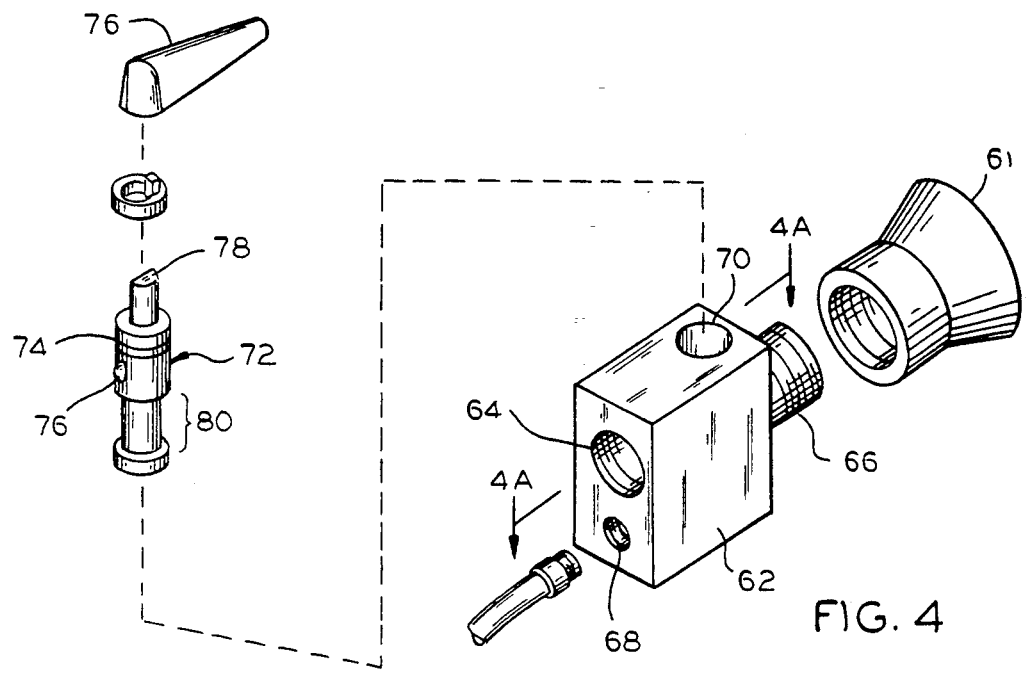
FIG. 4
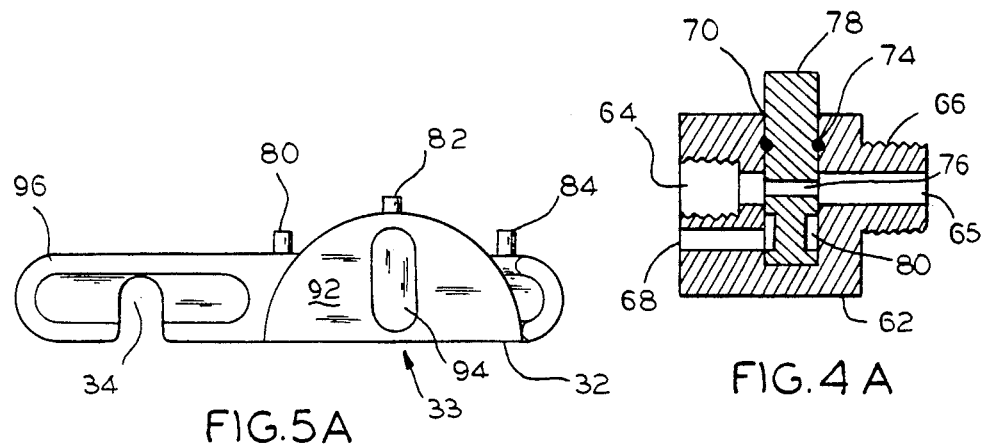
FIG. 5A
FIG. 4A
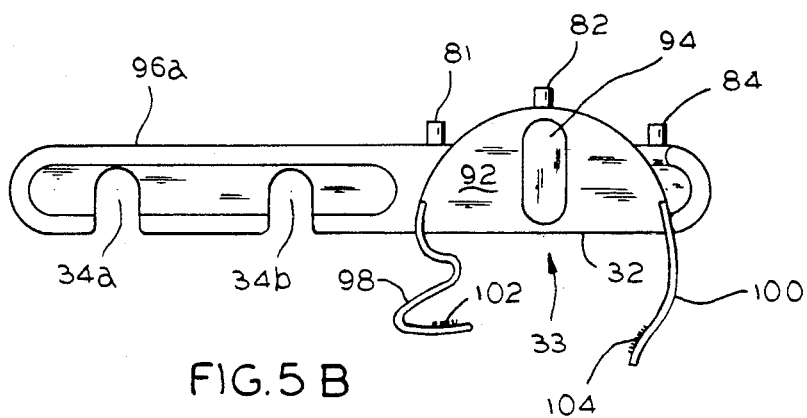
FIG. 5B

MIRROR AND CADDY FOR USE IN SHOWERS

This invention relates to mirrors and more particularly to a combined mirror and caddy for use in crowded and steam filled areas, such as a shower stall, for example.

The inventive type of mirror is most often used in a shower, especially during shaving. Examples of similar mirrors are found in the following U.S. Pat. Nos.: 5,058,271; 4,904,072; 4,836,668; 4,832,475; 4,150,869; 3,708,218; 3,594,063; and Re 32,906.

This type of mirror presents several problems since it is often used in a hot and steam filled shower stall, or the like, where space is at a premium and where an injury might have extremely serious consequences. A second problem is that the mirror and the surrounding environment might be at different temperatures which could steam over the reflecting surface to make it unusable. A person might be cut if he should handle or step on a razor or a razor blade while he is trying to see his face on a steam clouded mirror. The hot water could result in scalding a person if he has to manipulate a faucet while in an awkward or extended position. Any of these and other similar events may be especially serious in a shower stall with a glass door which could break if a person should fall against it.

When the prior art has addressed these problems, it has often provided a cabinet which was large enough to house many things such as shampoos, medications, shaving paraphernalia, and the like. Since these things tend to accumulate to fill all available space, these cabinets tend to become crowded to an extent that the user would likely knock things down causing them to fall out of the cabinet. Wet and soapy hands would increase the problems and make accidents more likely.

For these and other reasons, the mirrors shown and described in the above identified patents have not become as popular as they could be.

Accordingly, an object of the invention is to provide new and improved fogless mirrors combined with convenience caddies, for use in steamy environments. Here, an object is to provide a caddy for keeping a few specific things which are really needed at one's fingertips so that it is not necessary to rummage through a great number of unneeded things while one's hands are wet and soapy.

Another object is to provide a water supply which is available on demand without requiring one to reach, stretch, or manipulate hard to reach valves in an awkward manner. Here, an object is to provide an easy to use means for washing shaving debris away from a safety razor.

Still another object is to provide a safe, low cost mirror and caddy of the described type which is free of glass or other materials which might break, or otherwise create a hazard to the user.

In keeping with an aspect of this invention, these and other objects are accomplished by a mirror having a recessed shelf area which receives and supports approximately half the diameter of the bottom of an aerosol can of shaving cream, leaving approximately half of the can projecting outwardly beyond the mirror so that it may be grasped easily. The mirror also has a shelf which holds one or two safety razors adjacent the can of shaving cream. A push button on the mirror delivers shower water onto the mirror in order to equalize the temperatures of the mirror and environment and to deliver a stream of water for washing away debris. According to the invention, the water supply for the mirror is obtained from the existing shower head supply pipe and may be diverted exclusively to the mirror, so that when the mirror is in use, water flows only when requested by the user.

A preferred embodiment is shown in the attached drawings, wherein:

FIG. 1 is a perspective, generally front elevation view of a mirror and caddy;

FIG. 2 is a schematic housing detail drawing showing the front of the mirror housing;

FIG. 3 is a drawing schematically showing a detail on the back of the front mirror panel which provides a water path, also shown in FIG. 2;

FIG. 3A is a perspective view showing a water delivery spout, also seen in FIG. 3;

FIG. 4 is a perspective view of a diversion valve for delivering water to the mirror-caddy assembly;

FIG. 4A is a cross section of a diverter valve for delivering water to the mirror; and FIGS. 5A, 5B are top plan views of a shelf which provides means for holding one or two safety razors, respectively, and a can of shaving cream.

FIG. 1 shows a mirror housing 20 which may be mounted on a wall in any suitable manner, as for example, by being hooked over a door or wall of a shower stall or a pipe leading to a shower head, by "Velcro" hook and loop fasteners, by nails, by screws, or by other suitable means. The mirror 22 itself is preferably a reflecting, unbreakable, plastic member.

The mirror's surface will fog if the surface is cold relative to its surroundings. Means are therefore provided for keeping the mirror from steaming or fogging responsive to the hot steamy environment. More particularly, a fitting 24 at the top of the housing 20 is connected to a source of water. The inflow 25 of water is controlled by a push button 26 on the mirror. The water 27 exits at a fitting 28 on the bottom of the mirror. Between the push button 26 and exit fitting 28, a number of holes 30 in the housing member 20 emit a spray of hot water onto the surface of the mirror 22 in order to equalize the temperatures of the mirror and its environment.

The frame has a shelf 32 on the bottom for receiving a safety razor at 34 and a recess 36 for receiving a can of shaving cream. Suitable means are provided for holding the can of shaving cream in place within the recess 36. For metal shaving cream cans, preferably a magnet 38 is placed behind the recess wall. For other non-metal (plastic, for example) cans the member 38 may be another suitable fastener, such as a "Velcro" hook and loop fastener.

Another holder may use a strap (shown in FIG. 5B) attached to the left and right sides of the recess 36. A fastener, such as a "Velcro" hook and loop fastener, for example, may be used to hold the straps together.

The mirror frame 40 is preferably two (front and back) plastic members 40a, 40b which snap together. The back plastic member 40a is merely a solid plastic plate in the shape and size of the mirror-caddy frame 20, with suitable clips integrally formed thereon for capturing the front plastic member (FIGS. 2, 3).

FIG. 3 shows a back of view of the water channel, parts of which are also seen in front view FIG. 2. In the front view (FIG. 2), the front plastic member 40a has a passageway 42 for receiving the inlet fitting 24 (FIG. 1) at the top of the frame. An opening 44 receives a valve 45 (FIG. 3) controlled by push button 26 for opening and closing the inlet 42. Along the inside edge at the top member 46 of the frame is a row of spray holes (one of which is labeled 30) which spray a temperature equalizing wash of water onto the surface of mirror 22, as long as the push button 26 is pressed to open valve 45.

An opening 48 (FIG. 2) near the bottom of the frame receives the exit fitting 28 (FIGS. 1, 3). Any water entering at 42 and not exiting via spray holes 30 exits at 48. A number of arrows 50 indicate the water flow path from inlet 42 to outlet 48. This exit water may be used to wash any debris from a razor.

The depressed push button 26 presses downwardly upon a spring biased washer 45 (FIG. 3) which opens a passageway to inlet 42. When the push button 26 is released, a spring pushes the washer 45 back to close the inlet passageway 42 and terminate the water flow.

Near the bottom of the water channel is an annular recess 54 (FIGS. 2, 3, 3A). The exit 28 has a jet nozzle 56 with an outstanding disk shaped member 58 which fits into the recess 54, to provide a rotary mount for the exit fitting. Therefore, a user may grasp an off-set end 60 to rotate exit fitting 28 and thereby point jet nozzle 56 to discharge a stream of water in any convenient direction in order to wash away the shaving debris from a razor.

The preferred water source is provided by interposing a water diversion block 62 between an existing shower head 61 and the wall-mounted pipe which supplies it (see FIGS. 4 and 4A). The diversion block 62 includes a valve which allows the shower user to select whether water will be supplied to the shower head 61 or will be diverted so that it is available exclusively to the mirror housing 20. When the user has directed the water to the shower head, it operates normally. When the user has diverted the water to the mirror housing, no water is available to the shower head. However, the user may actuate push button 26 on the housing 20 to allow the hot water to escape from the mirror holes 30 and the exit fitting 28 for use in defogging the mirror 22 and cleaning a razor. Hence, when the water is diverted to the mirror housing, water flows only when requested by the user. The present invention thus provides a significant water saving advantage over prior art mirrors, which generally have required water to flow continuously, and at high rates, during use in order to heat the mirror.

To install the diversion block 62, the existing shower head 61 is removed (FIGS. 4, 4a). Usually there is a threaded connection between the shower head 61 and a wall mounted plumbing pipe (not shown). The shower head may be unscrewed from a residential plumbing pipe by simply turning the shower head. Then, a hole 64 in diversion block 62 is threaded onto the plumbing pipe. The shower head is attached at the end 66 of block 62.

A suitable hose or pipe (not shown) is attached between outlet 68 and the inlet fitting 24 (FIG. 1). A hole 70 in block 62 receives a rotary member 72 which is sealed in hole 70 by an 0-ring 74. A hole 76 in rotor 72 enables water to flow through inlet 64 and outlet 65 to shower head 61. In a proper position, rotor 72 diverts water into an annular rotor recess 80, out the exit 68 and through an attached hose or pipe to the inlet fitting 24 of mirror-caddy 20. A handle 76 fits over a half round section 78 in order to turn the rotor 72 between water flow and shutoff positions.

The bottom shelf 33 is seen in FIGS. 5A, 5B. Three dowels 81, 82, 84 are formed on the back of the shelf 33 to fit into holes 86, 88, 90 (FIG. 2), where they may be heat staked or ultrasonically welded in place. Shelf 33 has a semicircular member 92 which fits into recessed area 36 (FIG. 1) to receive the bottom of a can of shaving cream. A dome 94 rises sufficiently to receive an inwardly directed dome conventionally found on the bottom of a can of shaving cream to help hold the can in place without seriously impeding emplacing and removing the can.

A cut out section 34 on shelf 33 receives the handle of razor. In order to stabilize its position, an upstanding rim 96 surrounds the head of a razor while it is hanging in section 34. FIG. 5A shows only a single space 34 for hanging one razor. In FIG. 5B, there are two areas 34a and 35b, and rim 96 is enlarged to receive two hanging razors. It is presently thought that a shelf for supporting two razors will be most popular.

FIG. 5B shows two straps 98, 100, ending in "Velcro" hook and loop fasteners 102, 104, for securing a can of shaving cream in place within the recess 36 (FIG. 1). This same kind of strap may also be located on the front frame member 40a at a point which is higher on the recess 36.

Those who are skilled in the art will readily perceive how to modify the invention. Therefore, the appended claims are to be construed to cover all equivalent structures which fall within the true scope and spirit of the invention.

The claimed invention is:

1. A mirror and caddy for use in steamy environments, said mirror and caddy comprising:

a mirror and a frame surrounding said mirror, said frame having a channel for receiving water, conveying said water past said mirror, and exiting said water from said frame, said channel having an inlet near the top of said frame and an exit near the bottom of said frame;

said channel having means for directing a stream of water onto a surface of a mirror in order to equalize the temperature of said mirror with the temperature of the surroundings;

stream diverting means at the channel exit for directing water leaving said channel in a selected direction;

said frame having a recess in which a can may set with a portion of the can projecting outwardly from the frame for easy grasping;

a shelf on the bottom of said mirror, said shelf having an area formed thereon to fit into said frame recess in order to receive and support a portion of a surface of said can, and to receive a hanging razor; and holding means for securing said can while it is disposed in said recess.

2. The mirror and caddy of claim 1 and means on said frame for hanging two razors on said shelf.

3. The mirror and caddy of claim 1 and means for coupling said channel to a plumbing pipe associated with a shower head.

4. The mirror and caddy of claim 3 and push button means on said frame for delivering water from said plumbing pipe, through said channel and out said means for directing a stream of water onto said mirror and out an exit of said frame.

5. The mirror and caddy of claim 4 and means for diverting a stream of water exiting said channel to a direction convenient to the user.

6. A mirror and caddy for use in steamy environments, said mirror and caddy comprising:
   a mirror and a frame surrounding said mirror, said frame having a channel for receiving water, conveying said water past said mirror, and exiting said water from said frame;
   said channel having means for directing a stream of water onto a surface of a mirror in order to equalize the temperature of said mirror with the temperature of the surroundings;
   said frame having a recess in which a can may set with a portion of the can projecting outwardly from the frame for easy grasping;
   a shelf on the bottom of said mirror, said shelf having an area formed thereon to fit into said frame recess in order to receive and support a portion of a surface of said can, and to receive a hanging razor; and
   a magnet in said frame adjacent said can for securing said can in said recess.

7. A mirror and caddy for use in steamy environments, said mirror and caddy comprising:
   a mirror and a frame surrounding said mirror, said frame having a channel for receiving water, conveying said water past said mirror, and exiting said water from said frame;
   said channel having means for directing a stream of water onto a surface of a mirror in order to equalize the temperature of said mirror with the temperature of the surroundings;
   said frame having a recess in which a can may set with a portion of the can projecting outwardly from the frame for easy grasping;
   a shelf on the bottom of said mirror, said shelf having an arc formed thereon to fit into said frame recess in order to receive and support a portion of a surface of said can, and to receive a hanging razor; and
   a strap having fastening means fitting around a can on said shelf for securing said can in said recess.

8. The mirror and caddy of one of the claim 6 or 7 and a raised dome on said shelf for receiving and engaging a rim on the bottom of said can.

9. A mirror comprising a frame having a vertically extending semi-cylindrical recess for receiving approximately half of a cylindrical can while exposing the remaining approximately half of the can for easy grasping; means at the bottom of said recess for supporting the weight of said can, means for capturing said can while supported in said recess; a water channel extending from an inlet near the top of said frame, and around said frame to an exit location of said frame near the bottom of said frame, at least one exit between said inlet and said exit of said frame for spraying water onto said mirror for equalizing the temperature thereof to the surrounding environment; and stream diverting means near the bottom of said frame for directing water leaving said channel in a selected direction.

10. The mirror of claim 9 wherein said stream diverting means comprises a tube having an annular enlargement and a complimentary annular recess is provided in said channel for receiving said annular enlargement and providing a rotary mount for said tube.

11. The mirror of claim 10 and a push button valve in said channel and positioned between said inlet location and said exit near the bottom of said frame, said push button valve admitting a stream of water into said channel.

12. The mirror of claim 11 and means for hanging at least one razor from said frame.

13. The mirror of claim 11 and means for hanging two razors from said frame.

14. The mirror of any one of the claims 9, 10, 11 or 12 wherein said capture means comprises a magnet built into said frame and said can supporting means comprises a shelf having a dome for circumferentially holding a rim on the bottom of said can.

15. A frame comprising a water channel in said frame extending from an inlet to an outlet and surrounding at least part of said frame, a valve in said channel for controlling the flow of water therethrough, a mirror in said frame and positioned to receive a spray of water for heating a surface of said mirror to the temperature of said water, a semi-cylindrical recess in said frame for receiving one half of a cylindrical can holding means for securing said can in said recess while enabling an easy grasping and removal of said can from said recess, and means on said frame for supporting at least one razor.

16. A mirror and caddy comprising:
   a mirror and a frame at least partially surrounding said mirror;
   a water channel in said frame extending from an inlet to an outlet, said channel surrounding at least part of said mirror;
   means in said water channel for spraying water onto said mirror in order to equalize the temperature of said mirror to the surrounding environment;
   means located at the inlet of said channel for admitting water into said channel;
   stream diverting means at the outlet of said channel for directing water leaving said channel in a selected direction; and
   a recess formed in said frame in which a can may set.

17. The mirror and caddy of claim 16 wherein said recess is formed so that a protion of said can which is set in the recess projects outwardly from said frame for easy grasping.

18. The mirror and caddy of claim 16 including holding means for securing said can in said recess.

19. The mirror and caddy of claim 16 wherein a raised dome is formed in said recess for engaging the bottom of said can.

20. The mirror and caddy of claim 16 including means for coupling said channel to a shower head.

21. The mirror and caddy of claim 16 wherein water from said channel is sprayed onto the front surface of said mirror.

22. The mirror and caddy of claim 16 including means on said frame for supporting at least one razor.

* * * * *